United States Patent
Beier et al.

(10) Patent No.: US 9,022,488 B2
(45) Date of Patent: May 5, 2015

(54) FAULT-TOLERANT VEHICLE BRAKE SYSTEM

(75) Inventors: Peter Beier, Wunstorf (DE); Uwe Bensch, Hannover (DE); Christoph Brockmann, Hemmingen (DE); Gerhard Bruns, Hannover (DE); Henning Förster, Nordstemmen (DE); Olaf Jantz, Hannover (DE); Hartmut Rosendahl, Hannover (DE); Wolfgang Strache, Hemmingen (DE); Jens Willms, Seelze (DE)

(73) Assignee: WABCO GmbH, Hannover (DE)

( * ) Notice: Subject to any disclaimer, the term of this patent is extended or adjusted under 35 U.S.C. 154(b) by 595 days.

(21) Appl. No.: 12/734,991

(22) PCT Filed: Oct. 23, 2008

(86) PCT No.: PCT/EP2008/008956
§ 371 (c)(1),
(2), (4) Date: Sep. 22, 2010

(87) PCT Pub. No.: WO2009/086855
PCT Pub. Date: Jul. 16, 2009

(65) Prior Publication Data
US 2011/0005874 A1    Jan. 13, 2011

(30) Foreign Application Priority Data
Jan. 7, 2008 (DE) .......................... 10 2008 003 379

(51) Int. Cl.
*B60T 17/18*   (2006.01)
*B60T 13/26*   (2006.01)
(Continued)

(52) U.S. Cl.
CPC .............. *B60T 13/26* (2013.01); *Y10T 74/2054* (2015.01); *B60T 7/042* (2013.01); *B60T 13/66* (2013.01); *B60T 13/683* (2013.01); *B60T 17/18* (2013.01); *B60T 17/221* (2013.01)

(58) Field of Classification Search
CPC ............. B60T 8/88; B60T 8/92; B60T 8/885; B60T 17/18; B60T 17/22; B60T 17/221
USPC ......... 303/22.4, 89, 122.15, 123, 191, DIG. 9
See application file for complete search history.

(56) References Cited

U.S. PATENT DOCUMENTS 4,121,873 A * 10/1978 Durling ............................. 303/7
4,520,907 A *  6/1985 Sikora ........................... 188/156
(Continued)

FOREIGN PATENT DOCUMENTS

DE    199 16 434 A1   10/2000
DE    103 36 611 A1    3/2005
(Continued)

*Primary Examiner* — Bradley King
*Assistant Examiner* — Stephen Bowes
(74) *Attorney, Agent, or Firm* — Kramer Levin Naftalis & Frankel LLP

(57) ABSTRACT

A braking system for a vehicle, particularly a commercial vehicle, includes an operating brake device for providing an operating brake function for braking the vehicle, and a parking brake device for providing a parking brake function independently of the operating brake system. If one of the two braking devices partially or completely fails, the vehicle can be braked automatically by means of the other braking device.

29 Claims, 6 Drawing Sheets

(51) Int. Cl.
  *B60T 7/04* (2006.01)
  *B60T 13/66* (2006.01)
  *B60T 13/68* (2006.01)
  *B60T 17/22* (2006.01)

(56) References Cited

U.S. PATENT DOCUMENTS

| | | | | |
|---|---|---|---|---|
| 5,458,402 | A * | 10/1995 | Jeffery | 303/13 |
| 6,296,325 | B1 * | 10/2001 | Corio et al. | 303/20 |
| 6,345,225 | B1 * | 2/2002 | Bohm et al. | 701/70 |
| 6,449,551 | B1 * | 9/2002 | Wrede | 701/70 |
| 6,663,195 | B1 * | 12/2003 | Arnold | 303/122.03 |
| 6,709,069 | B2 * | 3/2004 | Riddiford et al. | 303/20 |
| 6,752,472 | B2 * | 6/2004 | Bezzina | 303/7 |
| 2001/0035679 | A1 * | 11/2001 | Riddiford et al. | 303/155 |
| 2004/0108769 | A1 * | 6/2004 | Marathe | 303/2 |
| 2005/0029859 | A1 | 2/2005 | Bensch et al. | |
| 2005/0104446 | A1 | 5/2005 | Chico et al. | |
| 2008/0149437 | A1 * | 6/2008 | Herges | 188/138 |

FOREIGN PATENT DOCUMENTS

| | | |
|---|---|---|
| EP | 1 533 227 A1 | 5/2005 |
| JP | 2006094615 A * | 4/2006 |

* cited by examiner

FAULT-TOLERANT VEHICLE BRAKE SYSTEM

FIELD OF THE INVENTION

The present invention generally relates to embodiments of a brake system for a vehicle, for example, a utility vehicle, having a service brake device for making available a service braking function for braking the vehicle, and a parking brake device for making available a parking braking function independently of the service brake device. In addition, the invention relates to a brake pedal device for such a brake system.

BACKGROUND OF THE INVENTION

A brake system of the general type under consideration is known, for example, from DE 103 36 611 A1. In such brake systems, a plurality of pneumatically operated service brake circuits, for example a first service brake circuit for the wheels of the front axle and a second service brake circuit for the wheels of the rear axle, are generally provided. The brake cylinders, which are assigned to the wheel brakes, are activated pneumatically. The pressure necessary for this is made available by a compressed air reservoir vessel assigned to the respective brake circuit. The brake pressure made available in this way is modulated by means of corresponding, electro-pneumatic brake control modules.

In electronic brake systems, these brake control modules receive, inter alia, electrical signals from an electro-pneumatic brake pedal device that has an electrical part and a pneumatic part. The electrical signals are converted into further electrical control signals for controlling electro-magnetic valves by means of which the brake pressure is metered.

A first service brake circuit for the wheels of the front axle that has a corresponding front-axle brake control module is usually provided. In a corresponding way, a second service brake circuit for the wheels of the rear axle of a vehicle with a rear-axle brake control module is provided.

However, the electrical and/or electronic components of such an electronic brake system can fail. Accordingly, such a brake system must be capable of reliably bringing the vehicle to a standstill even when these electrical and/or electronic components fail.

For this reason, conventional brake pedal devices also have pneumatic components in addition to the above-mentioned electrical and/or electronic components. In this way, at the same time, the brake pedal device is used to generate a pneumatic redundancy pressure that can reliably brake the vehicle by means of the pneumatic subsystem when the electrical or electronic part of an electronic brake system fails.

Furthermore, such brake systems have a parking brake device. For this purpose, at least the wheels of an axle, generally of the rear axle, are embodied with combined spring-loaded/diaphragm brake cylinders. If the spring-loaded part is vented, a storage spring engages the brake. It is therefore possible for the vehicle to be securely held even in the pressureless state. In contrast, in the driving mode, the spring-loaded part is ventilated, with the result that the storage spring no longer applies the brake. In this operating state, the vehicle can then be braked by means of the diaphragm part or the service brake part of the combined storage-spring/diaphragm brake cylinder.

The parking brake is therefore conventionally released pneumatically. For this purpose, corresponding pneumatic lines are provided leading from the spring-loaded brake cylinders to electro-pneumatic control units and usually also into the driver's cab, it being possible to ventilate or vent the spring-loaded parts of the combined spring-loaded brake cylinders in the driver's cab by means of corresponding pneumatic valves. In some systems, even though the control of the parking braking function is activated electrically from the driver's cab, the parking brake is still also released pneumatically or applied mechanically by means of a storage spring. It is therefore possible for the piping for the driver's cab for the activation of the parking brake to be reduced. However, at the same time there is still a need for pneumatic piping at least from the electro-pneumatic control unit of the parking brake device to the spring-loaded brake cylinders.

In addition, in known brake systems the service braking function and the parking braking function are largely separated from one another conceptually and structurally so that the two functions are available independently of one another, in particular when one of the two functions fails. Although the driver of the vehicle with such a brake system can brake the vehicle in the event of failure of the service brake device by activating the parking brake device, this is a difficult task for the driver, in particular during critical driving situations, owing to the completely different functioning of the parking brake device. For example, the parking brake device is usually not equipped with anti-lock brake devices so that when the vehicle overbrakes unstable driving states can occur. This is exacerbated, in particular, because the parking brake device is usually activated manually by the driver. However, the braking sensation that the driver experiences with a manual brake differs substantially from the braking sensation occurring with a foot-operated brake. The risk of overbraking or underbraking through manual activation of the parking brake device is therefore particularly great. The two different brake devices of the parking brake and of the service brake in conventional brake systems are therefore only suitable to a limited degree for assuming the function of the respective other brake device in the event of a fault.

SUMMARY OF THE INVENTION

Generally speaking, it is an object of the present invention to improve the functioning of conventional brake systems of the type discussed above in the event of a fault. In accordance with embodiments of the present invention, such improvement is achievable with a brake system of the general type discussed above adapted such that, when one of the two brake devices fails partially or completely, the vehicle can automatically be braked, in particular arrested, by means of the respective other brake device.

A vehicle brake system according to embodiments of the present invention comprises a service brake device for making available a service braking function for braking the vehicle during the driving mode, and a parking brake device for making available a parking braking function for arresting the vehicle independently of the service brake device. In the event of a fault, the service braking function assumes the parking braking function, or vice-versa. The brake system is configured such that in such a case switching over from the failed braking function to the intact braking function occurs automatically, i.e., for example, in the event of failure of the service brake device the parking brake device assumes the service braking function, and in the event of failure of the parking brake device the service brake device assumes the parking braking function. Because this transfer of the respective other function takes place automatically, the vehicle driver can, for example, continue to brake the vehicle in the customary way with the brake pedal when the service brake device has failed even though the braking in this case takes place by means of the parking brake device.

Even in the event of failure of the parking brake device, the driver can arrest the vehicle, specifically by means of the service brake device. Since this is usually not a permanent solution for parking a vehicle, the driver should take further measures to permanently secure the vehicle, for example by positioning wedges at the vehicle tires. However, since the vehicle can in fact be at least temporarily arrested in this case, the driver is enabled to leave the vehicle in order to take such measures.

According to one embodiment of the invention, the parking brake device is operated electro-mechanically or electro-pneumatically, and has one or more electro-mechanical actuator elements or one or more spring-loaded brake cylinders that are controlled by an electro-pneumatic valve device. In response to an electrical control signal, an electro-motive force can be generated or a spring force can be respectively released, and a mechanical movement for braking and/or arresting a driven element, in particular a wheel and/or a drive shaft of the drive system of the vehicle can be carried out by means of this force, it being possible to make available an auxiliary braking function by means of the parking braking function in order to assist the service braking function.

The term "electro-pneumatic actuator elements" is understood to refer, for example, to electric motors such as, for example, servomotors. The term "electro-pneumatic valve device" is understood to refer, for example, to a parking brake module.

The auxiliary braking function is advantageously activated when one or more service brake circuits fail, with the result that redundancy for the service brake circuits is provided by means of the parking brake device. However, the auxiliary braking function can also be used to assist intact service brake circuits even in special, critical driving situations. The auxiliary braking function, which is made available by using the parking brake device to assist the service brake circuits, causes the different braking functions of assigned brake system components to be tightly meshed and to interact. This permits an overall increase in the efficiency of the brake system.

In one variant, the parking brake device is embodied purely electro-mechanically, i.e., without pneumatic or electro-pneumatic components. This dispenses with the need for piping between the actuator elements of the parking brake device and for a control unit for controlling the parking brake device. A pneumatic parking brake circuit is dispensed with. Overall, the design and the installation of a brake system are therefore simplified.

The electronic actuator element or elements of the parking brake device can advantageously be driven or adjusted by means of an electrical brake request signal or a signal that is derived from the electrical brake request signal. In fact, electro-mechanical actuator elements have short reaction times, with the result that anti-lock braking functions can also be implemented by means of electro-mechanical actuator elements. They are therefore advantageously suitable for assisting the service braking function within the scope of an auxiliary braking function.

In one embodiment, a brake pedal device for activating the service brake circuit or circuits is embodied purely electro-mechanically and serves to generate at least one electrical brake request signal. In this way, even pneumatic piping of the driver's cab can be avoided since, in this embodiment, a pneumatic redundancy circuit between the brake pedal device and an electro-pneumatic control unit of the brake system can be dispensed with. This reduces the outlay on the piping, in particular of the driver's cab.

The electro-mechanical actuator element or elements of the parking brake device is/are preferably adjustable in a metered fashion by changing the electrical control signal and therefore the respectively generated electro-motive force. The activation of the actuator elements can therefore also be metered. In this way, the braking effect of the actuator elements can also be metered. In a corresponding way, the spring-loaded brake cylinder or cylinders can be adjusted in a metered fashion by changing the electrical control signal, which is fed to the electro-pneumatic valve device in this case, and therefore the pressures that are fed into the spring-loaded brake cylinders or discharged therefrom.

In the event of failure in one or more or all of the service brake circuits, the parking brake device can therefore advantageously make available an auxiliary braking function in such a way that the vehicle can be braked in a metered fashion. That is, if a service brake circuit fails, the parking brake device takes over the function of braking the wheels affected by this failure. This is essentially possible without adversely affecting the braking effect if the electro-mechanical actuator elements or spring-loaded brake cylinders are correspondingly dimensioned. The parking brake device therefore makes available an auxiliary braking function by means of which the service brake can be assisted or replaced in a metered fashion if this should be necessary in the event of failure of one or more or all of the service brake circuits. This auxiliary braking function is advantageously made available here without a pneumatic redundancy circuit at the brake value generator.

In a further embodiment, the electro-mechanical actuator element or elements or the spring-loaded brake cylinder or cylinders controlled by the electro-pneumatic valve device is/are connected to at least one autonomous parking brake control unit of the parking brake device (provided separately from at least one service brake control unit of the service brake circuit or circuits), and can be controlled by the parking brake control unit. In this context, the parking brake device advantageously has an independent electrical power supply for supplying electricity to the parking brake control unit and the electro-mechanical actuator element or elements, which power supply is independent of an electrical power supply of the service brake control unit. This advantageously provides an autonomous subsystem of the brake system, specifically an autonomous parking brake system, which ensures an auxiliary braking function for the service brake. In this context, the supply of electricity to the electromechanical actuator elements or the electro-pneumatic valve device of the parking brake device is independent of the service brake circuits. The vehicle can therefore be reliably braked by means of the auxiliary braking function made available by the parking brake device, even in the event of electrical and pneumatic failure of the service brake circuits. The supply of electrical power to the parking brake control unit and the supply of electrical power to the service brake control unit are advantageously respectively embodied as a battery or respectively comprise a battery. Electrical supply circuits, which are respectively independent of one another for the parking brake device and for the service brake device, are therefore formed by means of these electrical power supplies or batteries.

The parking brake device advantageously has in each case at least one electro-mechanical actuator element or in each case one spring-loaded brake cylinder on the wheels of at least one rear axle and of at least one front axle of the vehicle, but in particular on all the wheels that can be braked with a pneumatic brake cylinder of the service brake circuit or circuits. At least the most important wheels of a vehicle, if appropriate all the wheels that are also braked by means of the service brake circuit or circuits, can therefore be braked by means of the auxiliary braking function using the parking brake device in the event of failure of a service brake circuit.

In another embodiment, the parking brake control unit and the service brake control unit or units is/are connected via a data line, in particular a CAN bus, for exchanging data between the parking brake control unit and the service brake control unit or units. In this way, the controllers of the service brake system and of the parking brake system can communicate with one another in order, for example, to detect failures in one of the two systems and take measures for compensating these failures.

The functional capability of the service brake circuit or circuits can advantageously be monitored by means of the parking brake control unit, and any failure in the service brake circuit or one service brake circuit or all the service brake circuits can be detected. In this context, the parking brake control unit is embodied such that in the event of any failure being thus detected the wheels of the failed service brake circuit can be braked, in particular as a function of the braking request signal, by means of the electro-mechanical actuator elements assigned to these wheels. In the event of failure of one or more service brake circuits, the parking brake device therefore assumes the function of braking the wheels that are affected by this failure. The failure therefore remains without appreciable consequences for the braking behavior of the vehicle. An auxiliary braking effect is therefore continued to be provided using the parking brake system whenever an individual fault occurs in the service brake system.

In a further embodiment, the functional capability of the parking brake control unit and/or of the electro-mechanical actuator elements or the electro-pneumatic valve device and/or the spring-loaded brake cylinders can be monitored by means of the service brake control units, and any failure in the parking brake control unit and/or the electro-mechanical actuator elements can be detected. In this context, the service brake control unit or units is/are embodied such that in the event of any failure being thus detected the wheels affected by the failure can be braked, by means of the service brake circuit or circuits, which are assigned to these wheels. That is, the function of the parking brake can therefore at least be ensured temporarily by means of the service brake. Arresting a vehicle by means of the service brake is not a permanently reliable measure, since the service brake requires a service brake pressure that generally escapes over time. In addition, legal requirements in some countries prohibit applying the brakes with liquid or gaseous media in the scope of the parking braking function, such as generally occurs in the implementation of the service braking function, since such media could escape owing to a leak and present the risk of the vehicle rolling away. However, in this way, the vehicle can at least be provisionally parked without rolling away in order, for example, to call for help in the event of failure of the parking brake device.

In this embodiment, the availability of the parking braking function is advantageously increased, in particular in the event of failure of the parking brake actuation system. This applies both to electro-pneumatic parking brakes and to electro-mechanical parking brakes. In particular, with known systems there is the disadvantage that in the event of failure of the actuation system of the parking brake device the spring-loaded brake cylinders can no longer be vented. The parking brake can therefore no longer be applied or activated. According to the embodiment of the invention described above, the brake system can, however, still achieve a parking brake effect even if the parking brake device has partially or completely failed and, in particular, if its actuation system has failed. In the event of failure of the actuation system of the parking brake device, a deceleration request signal or brake pressure signal can be transmitted to the service brake control unit or units by the driver via a data interface when the parking braking function is required. This service brake control unit or these service brake control units subsequently selects/select a deceleration request or brake pressure for the service braking function such that a braking effect that corresponds to the fault-free parking braking function can be achieved at the wheels of the vehicle.

Therefore, despite failure of the actuation system of the parking brake device, the vehicle can be parked using the service brake device as long as the service brake control unit or units is/are switched on. During this operating state, the vehicle can then be prevented from rolling away by further suitable measures, for example by applying spring-loaded brakes at the trailer or by positioning wedges in front of or behind the wheels of the vehicle.

An adverse effect on the functional capability of the parking brake device is advantageously signaled in the driver's cab of the vehicle, in particular acoustically and/or visually.

In a further embodiment, the service brake control unit or units is/are controlled such that even after an ignition system of the vehicle has been shut down the functional capability of the service brake circuit or circuits is maintained for a predetermined time period. That is, the service brake device maintains the parking braking function for a run-on time that corresponds to the predetermined time period even when the ignition of the vehicle is switched off. The service brake pressure in the brake cylinders is maintained for this purpose. The driver therefore does not have to leave the engine of the vehicle running in order to take securing measures for arresting the vehicle. Instead, the vehicle remains in the arrested state, at least for the predetermined time period, with the result that there is no risk of the vehicle rolling away. In this way, an auxiliary parking braking function is made available for the predetermined time period by means of the service brake device. During this time period, the supply of electrical power to the service brake control unit or units is advantageously connected electrically to the service brake control unit or units, and/or the service brake control unit or units is/are connected directly to a vehicle battery. This is a particularly effective solution for maintaining the functional capability of the service brake circuits even when the vehicle ignition is switched off.

After the auxiliary parking braking function has ended, the service brake control unit can advantageously be placed in an energy saving mode in which functional groups in the service brake control unit are deactivated.

In a still further embodiment, before the expiration of the predetermined time period during which the functional capability of the service brake circuit or circuits is maintained, a visual and/or acoustic warning signal, which is dependent on the expiry of this time period and can be a two-stage or multi-stage warning signal, is output, for example by means of automatic, clocked, activation of a horn or by automatic switching on of the hazard warning light or switching on, or clocked switching on, of the vehicle light system. The clocking time or cycle time is advantageously shortened just before the end of the auxiliary parking braking function. In this way, the driver is warned that the vehicle will continue to be prevented from rolling away only for a short time, i.e., the service brake device will continue to hold the vehicle only for a short time. If the driver has still not been able to permanently arrest the vehicle by suitable measures by the time the warning signal is output, the warning signal provides him with the opportunity of getting into the driver's cab and activating the service brake again, or of looking for a better parking place.

In another embodiment, the electro-mechanical actuator elements of the wheels of a first axle, in particular of the rear axle, are connected to a first service brake control unit of a first service brake circuit and can be controlled by this control unit, and the electro-mechanical actuator elements of the wheels of a second axle, in particular of the front axle, are connected to a second service brake control unit of a second service brake circuit and can be controlled by this control unit. The electro-mechanical actuator elements are therefore respectively supplied or controlled by the service brake control units.

In this context, the supply or control of the respective actuator elements is advantageously provided on a criss-cross axle basis. That is, the first service brake circuit is a brake circuit for braking the wheels of the front axle or axles, and the first service brake control unit is provided for controlling the brakes of the front axle or axles, while the second service brake circuit is a brake circuit for braking the wheels of the rear axle or axles, and the second service brake control unit is provided for controlling the brakes of the rear axle or axles. In this context, the actuator elements of the wheels of the front axle or axles are supplied and controlled by the second service brake control unit (for controlling the brakes of the rear axle or axles), while the actuator elements of the wheels of the rear axle or axles are supplied and controlled by the first service brake control unit (for controlling the brakes of the front axle or axles). The actuator elements usually assume the parking braking function or auxiliary braking function at the wheels.

Auxiliary braking with all the wheels, in particular the wheels of the failed service brake circuit, can still take place by virtue of this crossed-over actuation of the actuator elements, i.e., the actuation of the actuator elements of the rear axle by means of the service brake control unit provided for the front axle, and conversely this is also the case even in the event of failure of, for example, a pneumatic service brake circuit and also of the control unit.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

Exemplary embodiments of the present invention are illustrated in the accompanying drawings and will be explained in more detail hereinafter on the basis of the drawings, in which.

DETAILED DESCRIPTION OF THE PREFERRED EMBODIMENTS

Figure 1:
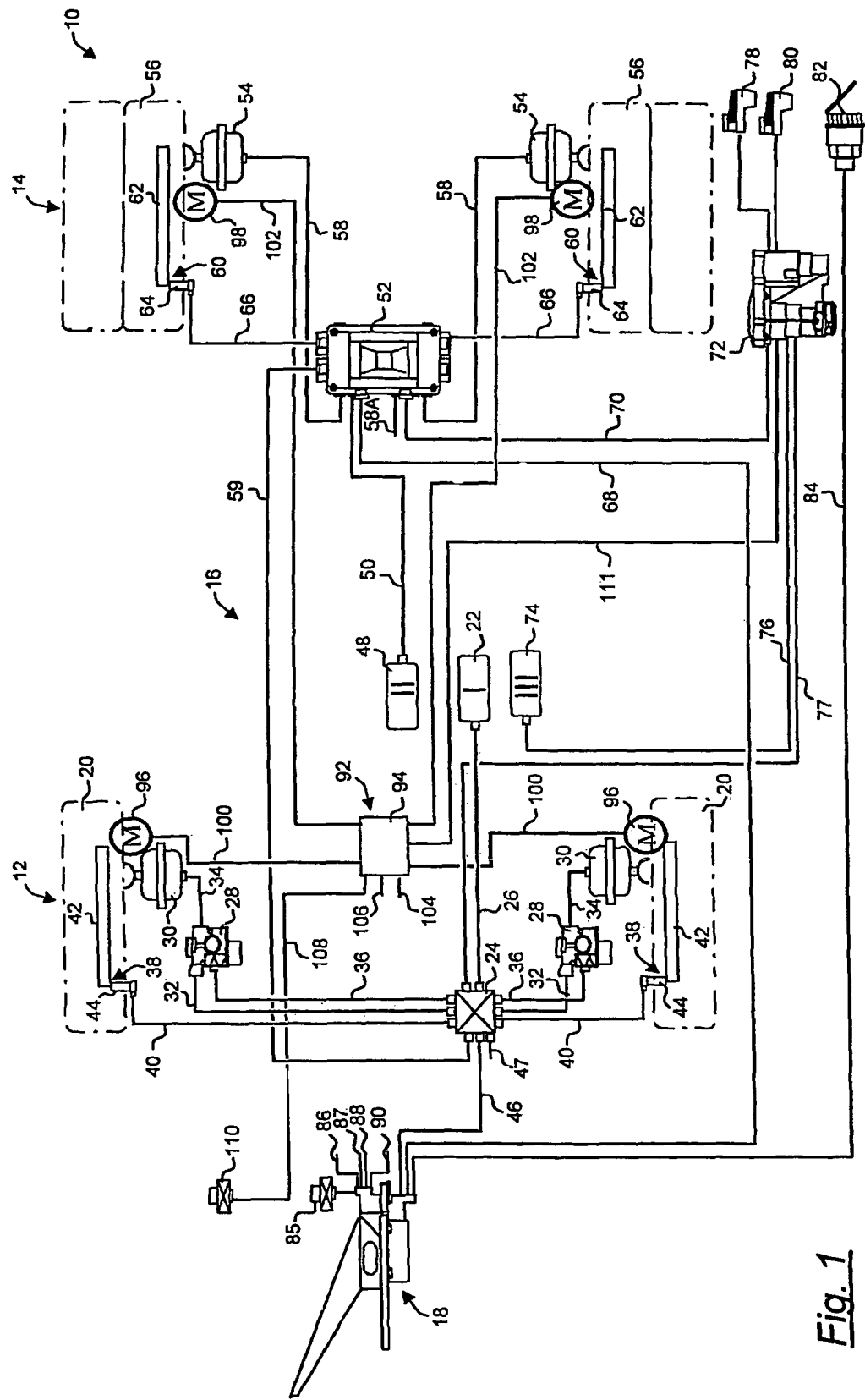
FIG. 1 is a schematic illustration of a brake system according to a first exemplary embodiment of the present invention.

Referring now to the drawing figures, FIG. 1 is a schematic view of a two-axle vehicle 10 with a front axle 12 and a rear axle 14 as well as brake system 16 with three brake circuits of a service brake that can be activated by means of a brake pedal device 18. However, it should be understood that the invention is not restricted to two-axle vehicles and can also be used in vehicles with more than two axles, in particular a plurality of rear axles and/or a plurality of front axles. A vehicle is also understood here to be, inter alia, a towing vehicle or else a vehicle without a towing function, for example a bus.

A first service brake circuit serves to brake the wheels 20 of the front axle 12. This first service brake circuit has a compressed air reservoir vessel 22 connected to a front axle brake control module 24 via a compressed air line 26. In addition, the first service brake circuit has for each of the wheels 20 a valve unit 28 via which compressed air can be fed, or from which compressed air can be discharged, and brake cylinders 30 of brakes at the wheels 20. The valve units 28 are therefore connected to the front axle brake control module 24 via compressed air lines 32, and to the brake cylinders 30 via compressed air lines 34.

In addition, the valve units 28 are connected to the front axle brake control module 24 via electrical lines 36 in order to receive control signals for activating the valve units 28. The two valve units 28 can also be advantageously integrated into the front axle brake control module 24.

In addition, wheel speed sensing devices 38 are provided at the wheels 20 and are connected to the front axle brake control module 24 via electrical lines 40. The wheel speed sensing devices 38 serve to determine the respective wheel speeds. They each include a pole wheel 42, which is connected in a rotationally fixed fashion to the respective wheel 20 and is coupled electromagnetically to a wheel sensor 44 that operates actively or passively. By means of the wheel speed sensing devices 38 it is possible, for example, to detect locking or slipping of the wheels 20 and to adjust the brake pressure supplied to the brake cylinders 30 using a corresponding control signal from the brake control module 24 to the valve units 28; in particular, it is possible to reduce the brake pressure when a wheel 20 has a tendency to lock. This makes available an anti-lock braking function for the wheels 20.

The front axle brake control module 24 is also connected to the brake pedal device 18 via an electrical line 46. This line 46 transmits an electrical brake request signal from the brake pedal device 18 to the front axle brake control module 24. Finally, the front axle brake control module 24 has a connection 47 for supplying electrical power.

A second brake circuit has a second compressed air reservoir vessel 48, which is pneumatically connected to a rear axle brake control module 52 via a compressed air line 50. This second brake circuit also comprises brake cylinders 54, with each of the brake cylinders being assigned to a wheel 56 of the rear axle 14. The brake cylinders 54 are connected to the rear axle brake control module 52 via compressed air lines 58. One or more valves for metering brake pressure for the brake cylinders 54 is/are provided within the rear axle brake control module 52.

The rear axle brake control module 52 has a terminal 58A for supplying electrical power. The rear axle control module 52 is also connected to the front axle brake control module 24 via a data line 59. Communication takes place between the two control modules via this data line 59. The control modules 24, 52 are embodied such that they can detect any malfunctions of the respective other control module.

Wheel speed sensing devices 60 are also provided at the wheels 56 of the rear axle 14 and permit the respective wheel speed to be determined. The wheel speed sensing devices 60 include a pole wheel 62 connected in a rotationally fixed fashion to the wheel 56, and are coupled electro-magnetically to a wheel sensor 64 that operates actively or passively (inductively). The wheel speed sensing devices 60, in particular the wheel sensors 64, are connected to the rear axle brake control module 52 via electrical lines 66. Locking or slipping of the wheels 56 of the rear axle 14 can be detected by means of the wheel speed sensing devices 60, and the metering of the brake pressure to the brake cylinders 64 can be correspondingly varied in order to counteract a tendency of the wheels 56 to lock or to slip.

The rear axle brake control module 52 is also connected to the brake pedal device 18 via an electrical line 68, and receives an electrical brake request signal from the brake pedal device 18 via this electrical line 68. Taking into account the electrical brake request signal, the rear axle brake control module 52, like the front axle brake control module 24, meters the brake pressure to be fed to the brake cylinders 54 and 30, respectively.

The rear axle brake control module 52 is additionally connected by an electrical line 70 to a trailer control valve 72 of a third brake circuit. This third brake circuit has a third compressed air reservoir vessel 74 connected to the trailer control valve 72 via a compressed air line 76. The trailer control valve 72 serves to control the brake pressure of a trailer vehicle (not illustrated) that can be hitched. In accordance with electrical control signals, in particular the electrical control signals received from the rear axle brake control module 52 via the electrical line 70 or from the front axle brake control module 24 via an electrical line 77, the trailer control valve 72 outputs, via compressed air terminals 78, 80, the compressed air drawn from the compressed air reservoir vessel 74 to a brake system of a trailer vehicle that can be hitched. The trailer control valve 72 therefore indirectly receives an electrical signal, for example a pulse-width-modulated signal representing the driver's braking request, via the rear axle brake control module 52 or the front axle brake control module 24.

In addition, an electrical plug-in terminal 82 for supplying current and transmitting data to and from the trailer vehicle is provided. The electrical plug-in terminal 82 is connected to the brake pedal device 18 via an electrical line 84.

The brake pedal device 18 is additionally connected to a rolling brake signal generator 85 via which a rolling braking function can be activated or deactivated. This rolling braking function is configured, for example, such that, after activation of the rolling braking function, when the vehicle is traveling the vehicle is monitored to determine whether it comes to a stationary state. When the stationary state of the vehicle is detected owing to activation of the brake by the driver, the respectively present or predetermined brake pressures in the brake cylinders 30, 54 and in the trailer brake system are then held at the currently present level, or at a predetermined level, automatically by activation of the valve units 28 and of the valves provided in the rear axle brake control module 52, without the driver having to continue to activate the brake pedal. As a result, the vehicle can be held stationary on an inclined roadway even after the brake pedal has been released. As soon as it is detected that the driver is attempting to drive off with the vehicle, the wheel brakes and the trailer brake system are automatically released.

The trailer control valve 72, rear axle brake control module 52 and front axle brake control module 24 do not have pneumatic control inlets. Instead, the pressures made available by these three components are metered on the basis of electrical signals. All three brake circuits are therefore electrically controlled brake circuits that are connected to the brake pedal device 18 only via electrical lines. In particular, the brake pedal device 18 does not supply the front axle brake control module 24, rear axle brake control module 52 or trailer control valve 72 with a redundancy pressure that could be used to meter brake pressure for brake cylinders of an axle in the event of failure of electrical components.

The brake system is therefore constructed as a purely electronically controlled brake system. The brake pedal device 18 therefore does not have any pneumatic components at all. In particular, the brake pedal device 18 does not have any ports for compressed air lines.

The brake pedal device 18, the front axle brake control module 24 and the rear axle brake control module 52 are connected directly or indirectly to one or more electrical power supplies (not illustrated). The brake pedal device 18 is advantageously connected via a terminal 86 to a first electrical power supply of a first circuit, which also supplies the front axle brake control module 24 via its terminal 47 and the rear axle brake control module 52 via its terminal 58A. The brake pedal device 18 is advantageously also connected via a terminal 87 to a second electrical power supply of a second circuit that also supplies a parking brake control unit 94. The brake pedal device 18 is therefore connected to both circuits. The brake pedal device 18 therefore advantageously has an at least dual power supply so that the function of the brake pedal device 18 is still ensured even in a simple fault situation.

The brake pedal device 18 additionally has a terminal 88 for a data bus, in particular for a CAN bus. However, instead of just one terminal 88, at least two data connections to the brake system are advantageously provided for reasons of redundancy.

Likewise, for reasons of redundancy, the brake pedal device 18 advantageously has at least two sensors for detecting the setpoint value of the brake request, for example of the deceleration request, which is output as an electrical brake request signal.

In addition, the brake pedal device 18 has a diagnostic terminal 90 that forms an interface, in particular for the terminal of a maintenance computer for maintenance and fault analysis.

The brake pedal device 18 can advantageously have one, more or all of the specified features and the following features: a control device and one or more terminals for actuating brake lights of the vehicle; sensors or terminals for reading out, if appropriate, only optionally present operator control elements of the brake system in the driver's cab of the vehicle, in particular in his cockpit; and/or terminals for actuating visual and/or acoustic signals of the brake system in the driver's cab, in particular in the cockpit, or outside the vehicle.

In addition, the brake pedal device 18 advantageously has at least one terminal for an electrical connection for controlling the drive unit of the vehicle for initiating an assisting engine brake. That is, a signal that initiates or controls an assisting engine brake can be generated by means of the brake pedal device 18.

The brake pedal device 18 also advantageously has a terminal for an electrical connection to a retarder for generating a braking effect by means of the retarder. That is, the brake pedal device 18 can generate an electrical signal for controlling the retarder brake.

In addition, the brake pedal device 18 advantageously has at least one terminal for an electrical connection to electromotive components in the drive train of the vehicle such as, for example, to a starter-generator unit, a hybrid unit or the like, by means of which a further assisting braking effect can be achieved. That is, the brake pedal device 18 generates at least one electrical signal for actuating such electro-motive components for generating further braking effects.

In an embodiment that is not illustrated, the control electronics or control logic of the front axle brake control module and/or of the rear axle brake control module are/is integrated into the brake pedal device, with the result that the corresponding electronics or logic are dispensed with in the respective module. The electro-pneumatic values of the front axle brake control module or of the rear axle brake control module can be actuated by the brake pedal device in this case.

Overall, the brake pedal device therefore forms an interface between the driver, the brake system and the rest of the vehicle.

The brake system 16 additionally comprises a parking brake device 92 that is embodied as an autonomous subsystem. The parking brake device 92 has a parking brake control unit 94 that can activate electro-mechanical actuator elements 96, 98, in particular electric motors, or pneumatic spring accumulators, provided at the wheels 20, 56. The actuator elements 96 are provided at the wheels 20 of the front axle 12, and the actuator elements 98 are provided at the wheels 56 of the rear axle 14. The actuator elements 96 are connected via electrical lines 100 to the parking brake control unit 94. The actuator elements 98 are connected to the parking brake control unit 94 via electrical lines 102.

In addition, the parking brake control unit 94 has a terminal 104 for a data bus, in particular a CAN bus. The terminal 104 is connected via the data bus to the corresponding terminal 88 of the brake pedal device 18.

Also, the parking brake control unit 94 has a terminal 106 for an electrical power supply (not illustrated). This electrical power supply is independent of the electrical power supply of the service brake circuits, in particular independent of the electrical power supply connected to the brake pedal device 18 via the terminal.

The parking brake control unit 94 is additionally connected via an electrical line 108 to an electrical activation device 110 for activating the parking brake. Finally, the parking brake control unit 94 is connected via an electrical line 111 to the trailer control valve 72, with the result that the (parking) brake in the trailer vehicle can be applied using a control signal.

The purely electrical control brake system 16 therefore has an autonomous brake subsystem, specifically the parking brake device 92 that can be operated independently of the service brake circuits. In the event of failure of one or more of the service brake circuits or even in the event of failure of the entire service brake, the vehicle 10 can still be reliably braked by means of the parking brake device 92 at the wheels that can be braked by means of the parking brake, preferably all the wheels. The parking brake device 92 therefore constitutes an auxiliary braking function for the service brake. Via the data bus, which forms a connection between the brake pedal device 18 and the parking brake control unit 94, data can be exchanged in order to be able to detect the failure of one or more service brake circuits. If, however, no data at all are received any more via the data bus from the parking brake control unit 94, this is detected as a failure of the service brake and the vehicle is automatically braked or an alarm signal is output so that the driver can brake the vehicle using the electrical activation device 110 or using the brake pedal device 18.

If, in the event of failure of one or all of the service brake circuits, communication is still possible from the brake pedal device 18 to the parking brake control unit 94 via the data bus, the auxiliary braking effect is advantageously made available by the brake pedal device 18 via the parking brake control unit 94.

The electro-mechanical actuator elements 96, 98 at each of the wheels 20, 56 are actuated using electrical control signals, with the result that the actuator elements 96, 98 can generate an electro-motive force corresponding to the respective control signal, and can execute a mechanical movement, by means of this force, for braking and/or arresting the wheel 20 or 56, respectively. These electro-mechanical actuator elements are advantageously constructed such that when the electrical control signals are interrupted the actuator element remains in the position that it last assumed. As a result, a brake applied by means of these actuator elements remains engaged even if the electrical signal supply or power supply to the actuator element 96, 98 is interrupted. The vehicle 10 can therefore be reliably and permanently arrested by means of the electrical actuator elements 96, 98. The actuator elements 96, 98 therefore form a parking brake. However, owing to its electrical controllability, they can also be adjusted in a graduated, i.e., metered, fashion. For this reason, they are also ideally suitable for assisting or assuming functions of the service brake, in particular as an auxiliary brake for the service brake.

A purely electrically or electronically activated service brake system is supplemented in this way with an electro-mechanical parking brake circuit, i.e., the parking brake device 92. In the event of failure of the pneumatic service brake, this parking brake device 92 ensures that there is sufficient auxiliary braking force. In the event of failure of one or more or all of the service brakes, this autonomous parking brake device 92 can be used to ensure sufficient auxiliary braking at the respective axles. In addition, a parking brake can therefore be applied at all the axles equipped with these actuator elements 96, 98.

The rolling braking function was explained above by means of the brake cylinders 30, 54 of the service brake circuits. However, in a further exemplary embodiment, the rolling braking function is additionally or alternatively implemented by means of the electro-mechanical actuator elements 96, 98. If the rolling brake signal generator 85 is activated so that the rolling braking function is activated, monitoring takes place when the vehicle is traveling to determine whether the vehicle has come to a stationary state. The wheel speed sensing devices 38, 60 are used for this purpose. When the stationary state of the vehicle is detected owing to activation of the brake by the driver, the electro-mechanical actuator elements 96, 98 are then activated automatically, with the result that the corresponding, assigned wheel brakes are applied. In turn, the driver does not now need to permanently activate the brake pedal. Instead, the vehicle can be held in the stationary state even on an inclined roadway even after the brake pedal has been released. However, as soon as the brake system detects that the driver is attempting to drive off with the vehicle, the wheel brakes, in particular the electro-mechanical actuator elements, as well as, if appropriate, the trailer brake system, are automatically released. The use of the electro-mechanical actuator elements has the advantage that even in the event of failure of the electrical power supply while the rolling braking function is activated in the stationary state of the vehicle and the brake pedal is released, the vehicle cannot roll away even in the case of an inclined roadway, since even in the event of power failure the electro-mechanical actuator elements keep the wheel brakes engaged. In this exemplary embodiment, it is possible to dispense with monitoring of the driver to determine whether, for example, he leaves the driver's seat. Monitoring of the driver is conventionally carried out in fact to avoid the driver leaving his driver's seat in the event of failure of the electrical power supply during such a phase of the activated rolling braking function during the stationary state of the vehicle since the driver believes that the vehicle is securely arrested. However, if the power then fails, in conventional roll brakes the service brake, which has been applied by means of the activated rolling braking function, would be released and the vehicle could roll away.

In a further exemplary embodiment, the rolling braking function is, as was initially explained above, implemented by means of the service brake circuits. That is, when the vehicle is in the stationary state and the rolling braking function is activated the brake pressures or predetermined brake pressures present in the brake cylinders 30, 54 and in the trailer brake system are held at the currently present level or at a predetermined level. In this exemplary embodiment, the parking brake device 92 or the parking brake control unit 94 then monitors the service brake circuits or service braking function of the brake system. If, in this context, a failure of service brake circuits or of the service braking function is determined, the parking brake device 92 or the parking brake control unit 94 assumes the rolling braking function by virtue of the fact that the electro-mechanical actuator elements 96, 98 are activated in order to apply the respective wheel brakes. However, this activation of the electro-mechanical actuator elements 96, 98 takes place only if the vehicle speed is zero, i.e., the vehicle is stationary. This stationary state is detected by means of the wheel speed sensing devices 38, 60.

The wheel speed sensing devices 38, 60 are, furthermore, used to detect whether the vehicle starts to roll when the roll brake is activated and the stationary state of the vehicle is firstly reached. If this is the case, the braking force is increased by virtue of the fact that the electro-mechanical actuator elements 96, 98 and/or the brake cylinders 30, 54 make available relatively large brake application forces for the wheel brakes.

In the exemplary embodiment shown in FIG. 1, the service brake device is electro-pneumatic, i.e., the wheel brakes are applied pneumatically when the brake pedal device 18 is activated, with the respective pneumatic service brake pressure being controlled electrically. In contrast, the parking brake device is electro-mechanical, i.e., when the electrical activation device 110 is activated the wheel brakes are applied mechanically by means of electro-mechanical actuator elements, with the respective mechanical brake force being controlled electrically. The terms electro-pneumatic service brake and electro-mechanical parking brake are therefore used.

Figure 2:
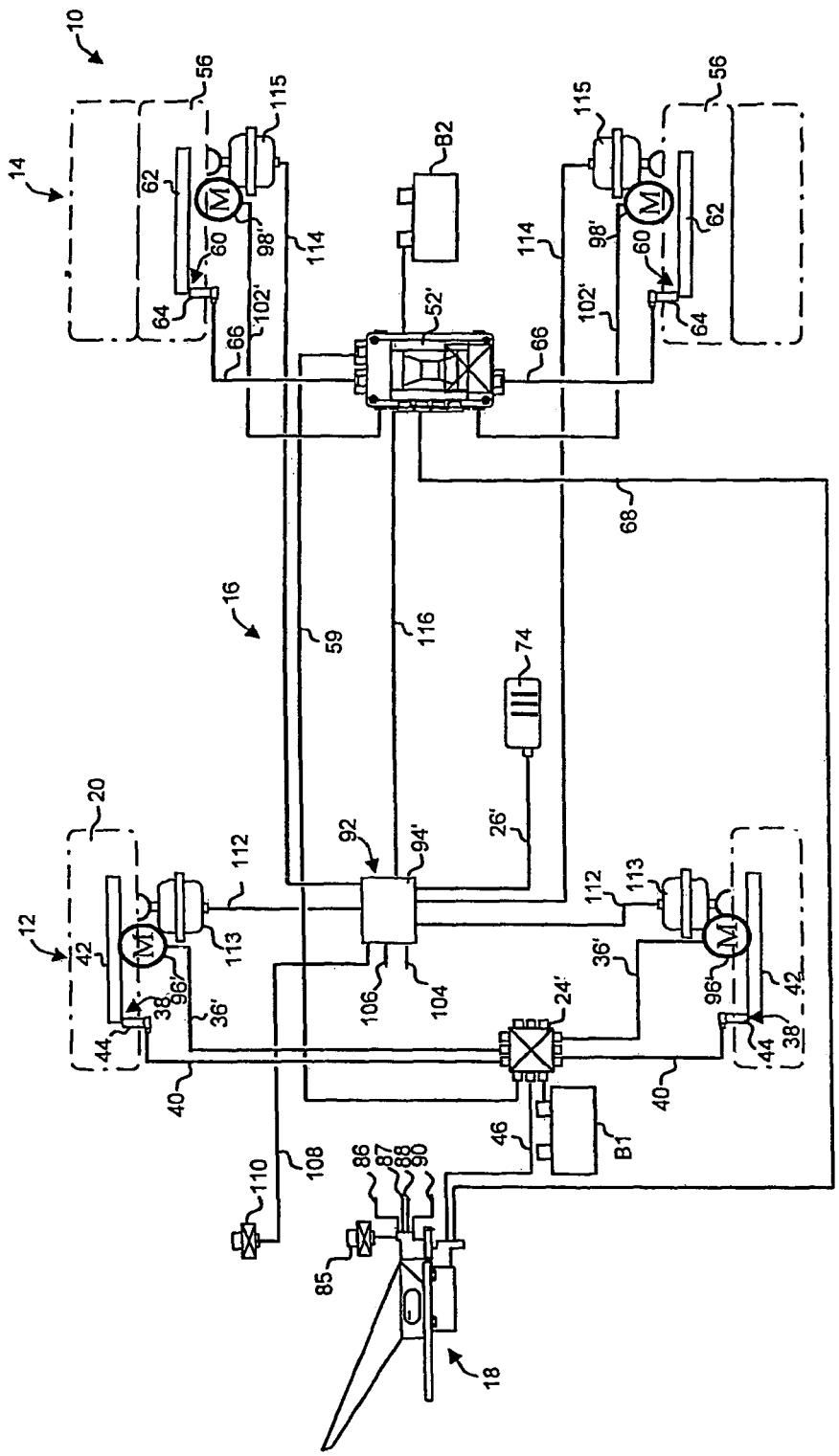
FIG. 2 is a schematic illustration of a brake system according to a second exemplary embodiment of the invention.

FIG. 2 illustrates an alternative exemplary embodiment of the invention in which the service brake is implemented electro-mechanically and the parking brake electro-pneumatically. The embodiment, the terminals and the wiring of the brake pedal device 18 correspond to those in FIG. 1. The front axle brake control module 24' is, however, now purely electrical. Pneumatic ports can therefore be dispensed with. The front axle brake control module 24' is connected via electrical lines 36' to electro-mechanical actuator elements 96' for activating the wheel brakes at the wheels 20 of the front axle. The front axle brake control module 24' has an independent electrical power supply in the form of a battery B1. Moreover, the terminals and wiring of the front axle brake control module 24' correspond to the front axle brake control module 24 according to FIG. 1.

The rear axle brake control module 52' is likewise now purely electrical. Pneumatic ports can therefore be dispensed with, including pneumatic ports for a trailer control module, and consequently also electrical terminals for any trailer control valve. The rear axle brake control module 52' is connected to electro-mechanical actuator elements 98' via electrical lines 102' for the activation of the wheel brakes at the wheels 56 of the rear axle. The rear axle brake control module 52' has an independent electrical power supply in the form of a battery B2. Moreover, the electrical terminals and wiring of the rear axle brake control module 52' corresponds to the rear axle brake control module 52 according to FIG. 1.

In contrast, the parking brake control unit 94' is now no longer purely electrical but rather electro-pneumatic. It is connected to the compressed air reservoir vessel 74 via a compressed air line 26'. The parking brake control unit 94' is connected to spring-loaded brake cylinders 113 at the wheels 20 of the front axle via compressed air lines 112. The parking brake control unit 94' is additionally connected to spring-loaded brake cylinders 115 at the wheels 56 of the rear axle via compressed air lines 114. These spring-loaded brake cylinders 113 and 115 make available a parking braking function, controlled by the parking brake control unit 94', preferably at both axles—but alternatively at just one axle. A data line 116 connects the parking brake control unit 94' to the rear axle brake control module 52' for data communication between the parking brake control unit 94' and the rear axle brake control module 52'. Moreover, the electrical terminals and wiring of the parking brake control unit 94' correspond to the parking brake control unit 94 according to FIG. 1.

Figure 3:
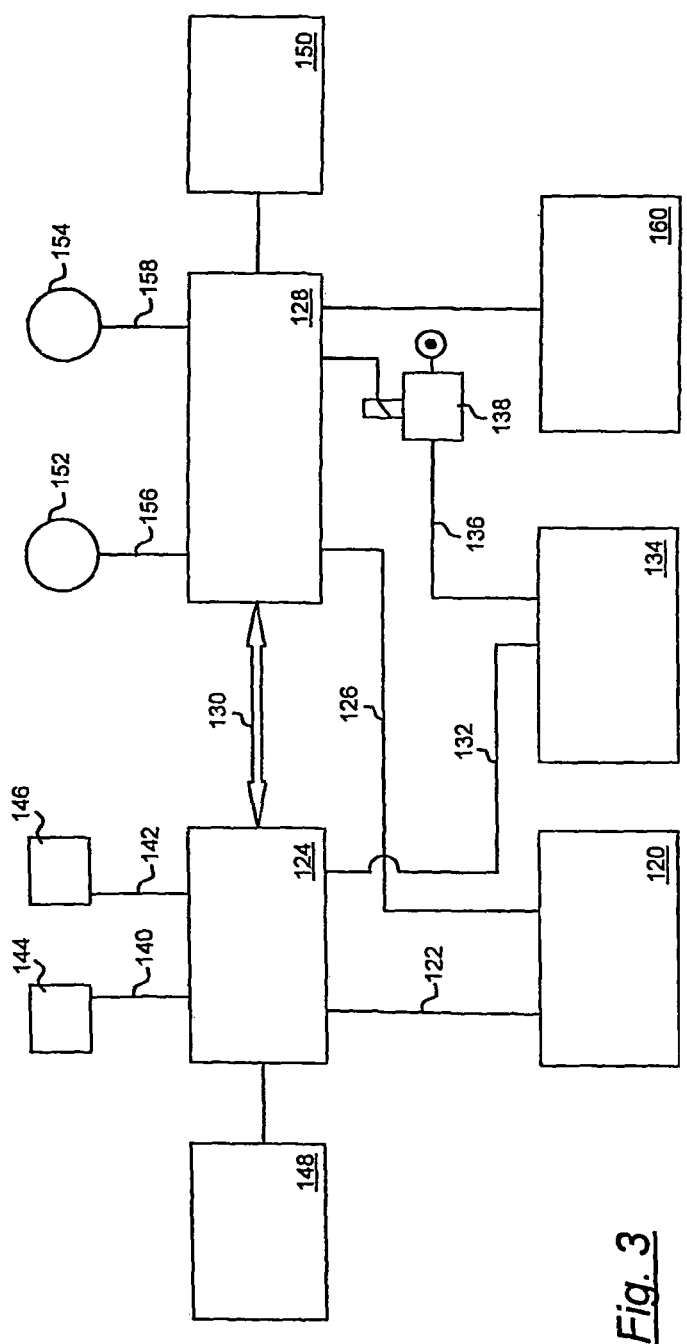
FIG. 3 is a block circuit diagram according to a third exemplary embodiment of the invention.

FIG. 3 is a block diagram illustrating a further exemplary embodiment of the invention. A brake value generator 120 of a brake pedal device (not illustrated) is connected to a service brake control unit 124 of an electronic brake system via an electrical line 122. In addition, the brake value generator 120 is electrically connected to a parking brake control unit 128 via an electrical line 126. The service brake control unit 124 and the parking brake control unit 128 are connected to one another via a data bus 130 for the mutual exchange of data. Furthermore, the service brake control unit 124 is electrically connected to a trailer control valve 134 via an electrical line 132. The trailer control valve 134 is connected via a compressed air line 136 to a valve device 138, which can be activated electrically. Finally, the valve device 136 is connected to a compressed air reservoir vessel (not illustrated).

The service brake control unit 124 is connected via electrical lines 140, 142 to valves 144 for supplying compressed air from brake cylinders, provided at the front axle of a vehicle, or to valves 146 for supplying compressed air to the brake cylinders provided at the rear axle of a vehicle.

The service brake control unit 124 is connected to a first electrical power supply 148. The parking brake control unit 128 is connected to a second electrical power supply 150.

In addition, the parking brake control unit 128 is electrically connected via electrical lines 156, 158 to electro-mechanical actuator elements 152 for the front axle of the vehicle and electro-mechanical actuator elements 154 for the rear axle of the vehicle. In addition, the parking brake control unit 128 is connected to an electrical activation device 162 in the form of a signal generator.

The exemplary embodiment illustrated in FIG. 3 corresponds largely to that illustrated in FIG. 1, but with simplifications with respect to the electronic components of the service brake, which are accommodated in the service brake control unit 124. This service brake control unit 124 combines the control logics of the front axle brake control module 24 and of the rear axle brake control module 52 of the exemplary embodiment according to FIG. 1.

The brake system illustrated in FIG. 3 essentially includes two subsystems. The first subsystem relates to the service brake, which is configured as an electronic brake system. The service brake control unit 124 actuates, as explained in conjunction with FIG. 1, the service brake valves 144, 146 for the front axle and the rear axle of the vehicle as well as, if appropriate, the trailer control valve 134. The service brake control unit 124 additionally reads in a first electrical circuit of the brake value generator, i.e., detects a value generated by the brake value generator. The service brake control unit 124 is supplied independently from the electrical power supply 148.

The second subsystem relates to the parking brake. The parking brake control unit 128 performs, as already explained in conjunction with the exemplary embodiment according to FIG. 1, the braking of the front axle using the actuator element or elements 152—insofar as these are provided—and the braking of the rear axle using the actuator element or elements 154, and the braking of the trailer using the trailer control valve 134—insofar as this is provided.

The braking of the wheels of the front axle or of the rear axle is carried out either by means of electro-motive application of the brakes by means of the electro-mechanical actuator elements 152, 154 or by venting spring-loaded brake cylinders. The braking of a trailer is carried out by venting a venting port on the trailer control valve 134. The parking brake control unit 128 reads in a second circuit of the brake value generator 120. Furthermore, the parking brake control unit 128 reads in the signal of the electrical activation device 160 for activating the parking brake. The parking brake control unit 128 is supplied from the second electrical power supply 150.

The service brake control unit 124 and the parking brake control unit 128 communicate with one another via the data bus 130. As a result of this communication, failures in one of the two subsystems can be reported so that the respective other subsystem can assume the functions of the failed subsystem. Whenever an individual fault occurs in the service brake system, an auxiliary braking effect continues to be provided by means of the parking brake subsystem using the activation elements of the parking brake, in particular the actuator elements 152, 154.

In the exemplary embodiment shown in FIG. 3, the actuator elements 152, 154 are illustrated as electro-mechanical actuator elements. Alternatively, electro-mechanical valve units can also be used. These electro-mechanical valve units modulate, in response to an electrical signal, pneumatic pressures to spring-loaded brake cylinders, which, in the case of venting of the spring-loaded brake cylinders, release a spring force stored in the storage springs, by means of which spring force mechanical movements in the wheel brakes for braking or arresting the driven wheels or a drive shaft are executed.

Figure 4:
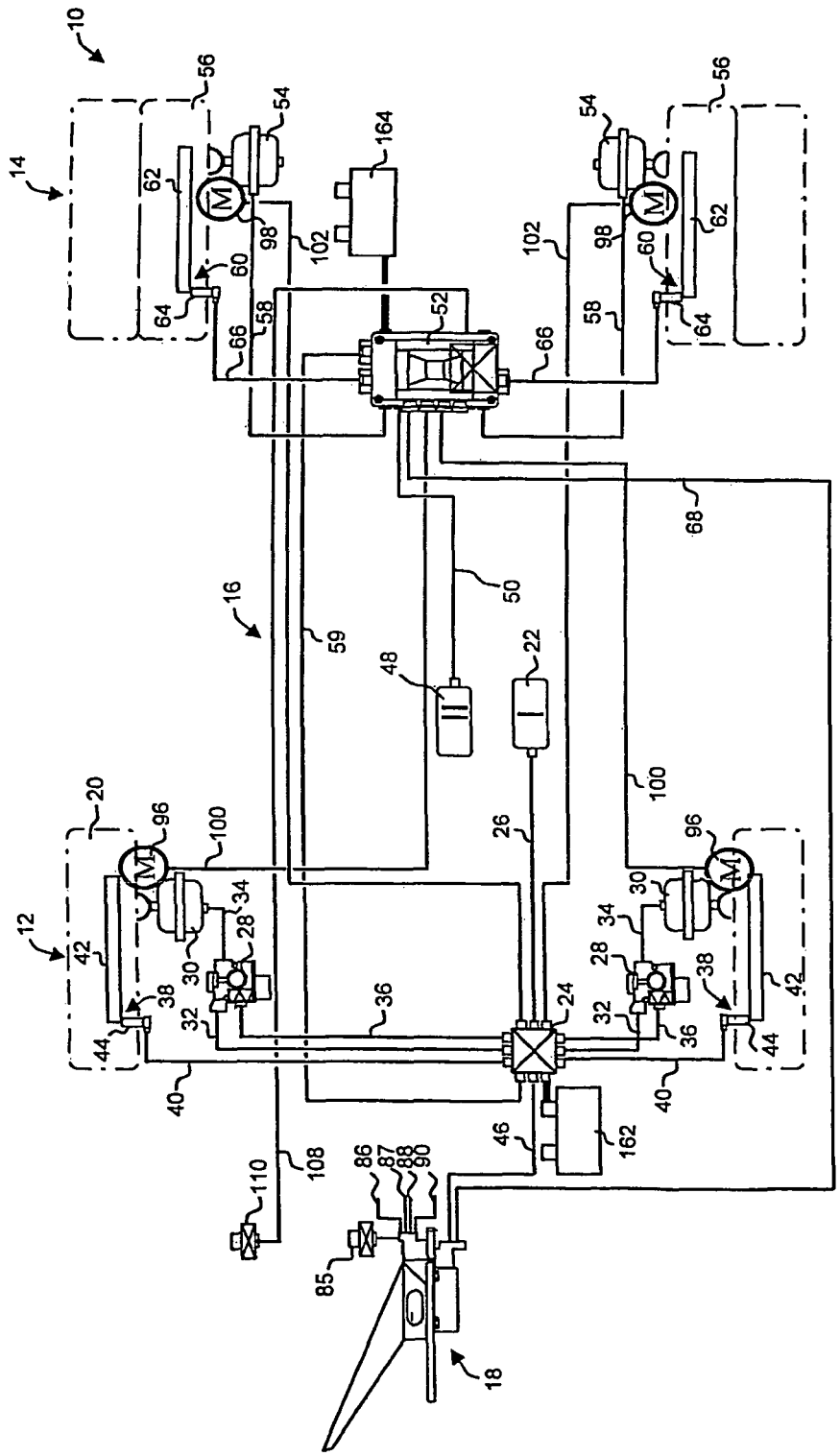
FIG. 4 is a schematic illustration of a brake system according to a fourth exemplary embodiment of the invention.

FIG. 4 shows a further exemplary embodiment of the invention, which corresponds largely to the exemplary embodiment shown in FIG. 1. The same reference numbers therefore denote the same components. With respect to these identical components, reference is made to the statements above. Differences will be explained in more detail below. For the sake of simplification, the trailer control valve 72 has been omitted, as have the lines leading to the trailer control valve 72 and the corresponding terminals 78, 80, 82.

One particular feature compared to the exemplary embodiment shown in FIG. 1 is, however, that the parking brake device in the exemplary embodiment according to FIG. 4 does not have an independent parking brake control device. The controllers of the actuator elements 96, 98 are, instead, accommodated in the front axle brake control module 24 and in the rear axle brake control module 52. In this exemplary embodiment, both the front axle brake control module 24 and the rear axle brake control module 52 each additionally have a separate electrical power supply 162, 164. The front axle brake control module 24 and the rear axle brake control module 52 are therefore independent of one another in terms of the electrical power supply.

It is to be noted that the actuator elements 98 of the wheels 56 of the rear axle 14 are connected to the front axle brake control module 24, while the actuator elements 96 of the wheels 20 of the front axle 12 are connected to the rear axle brake control module 52. In the event of failure of a supply circuit, for example of the rear axle brake control module 52 or of the associated electrical power supply 164, the service brake cylinders 54 of the rear axle 14 can no longer be actuated but the actuator elements 98 of the wheels 56 of the rear axle 14 can be actuated by the front axle brake control module 24. The front axle brake control module 24 detects a failure of the rear axle brake control module 52 on the basis of a modified or failed communication via the data line 59 via which the front axle brake control module 24 communicates with the rear axle brake control module 52.

After the front axle brake control module 24 has detected such a failure, it activates the actuator elements 98 of the wheels 56 of the rear axle 14 if the driver generates a brake request signal by means of the brake activation device 18. At the same time, failure of the second service brake circuit is indicated visually and/or acoustically to the driver.

In the event of failure of the first brake circuit, the rear axle brake control module 52 assumes the actuation of the actuator elements 96 in an analogous fashion.

In the event of failure of a brake circuit, it is therefore still possible to perform braking at all the wheels 20, 56. In addition, even in the event of failure of an axle control unit the function of the parking brake at at least one axle can be ensured.

Figure 5:
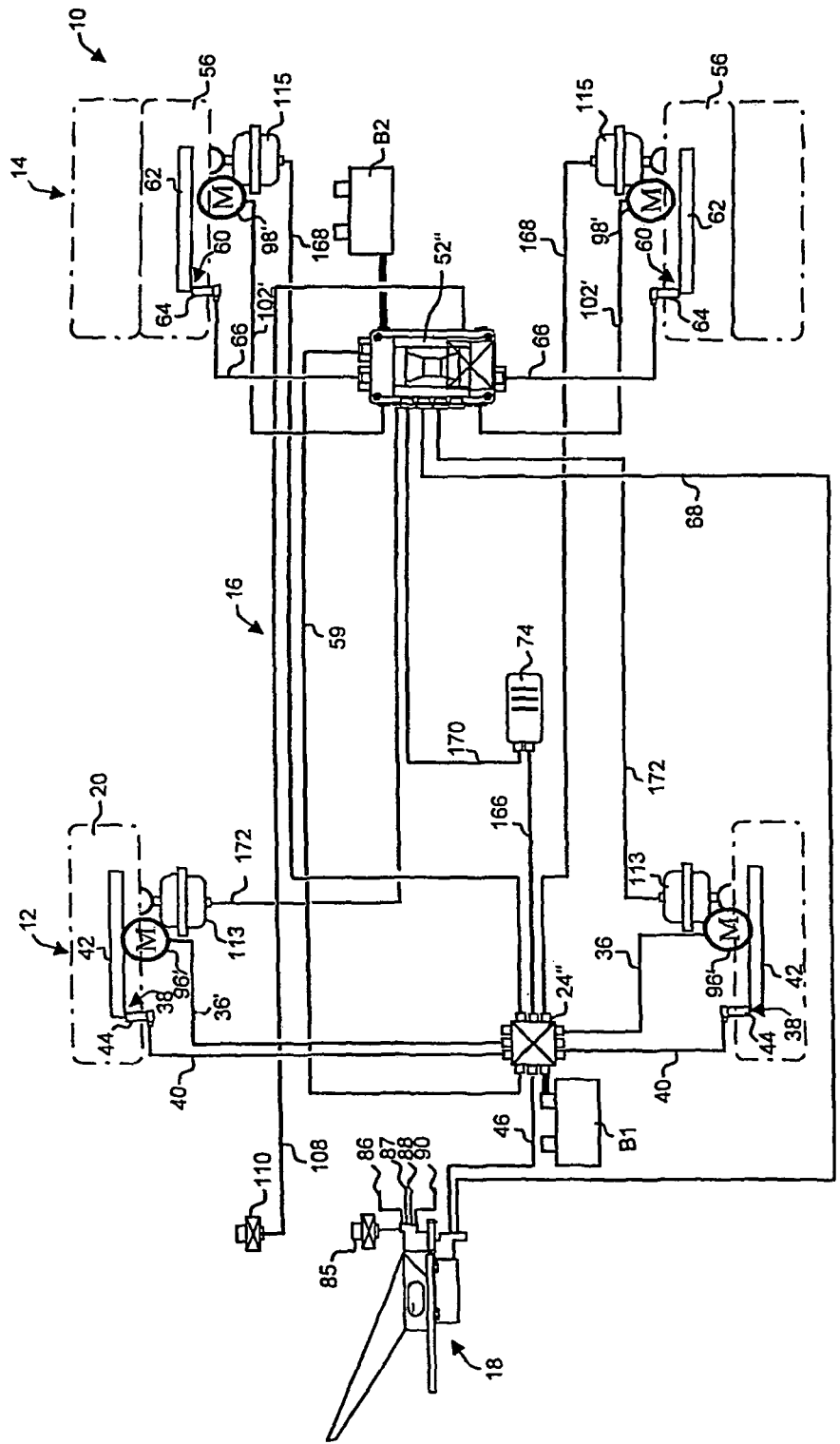
FIG. 5 is a schematic illustration of a brake system according to a fifth exemplary embodiment of the invention.

FIG. 5 shows a further exemplary embodiment in which, in turn, the service brake is implemented electro-mechanically and the parking brake electro-pneumatically. The embodiment, the terminals and the wiring of the brake pedal device 18 correspond again to those from FIGS. 1, 2 and 4, respectively. However, the front axle brake control module 24" controls the (electro-mechanical) service brake at the front axle and the (electro-pneumatic) parking brake at the rear axle, while the rear axle brake control module 52" controls the (electro-mechanical) service brake at the rear axle and the (electro-pneumatic) parking brake at the front axle. Both the front axle brake control module 24" and the rear axle brake control module 52" have electrical and pneumatic components and terminals/ports.

The front axle brake control module 24" is, in turn, connected via electrical lines 36' to electro-mechanical actuator elements 96' for activating the wheel brakes at the wheels 20 of the front axle. The front axle brake control module 24" also has an independent electrical power supply in the form of the battery B1. Furthermore, the front axle brake control module 24" is connected to the compressed air reservoir vessel 74 via a compressed air line 166. The front axle brake control module 24" is, however, connected now to the spring-loaded brake cylinders 115 at the wheels 56 of the rear axle via compressed air lines 168. These spring-loaded brake cylinders 115 make available a parking braking function, controlled by the front axle brake control module 24", at the rear axle. Moreover, the electrical terminals and wiring of the front axle brake control module 24" correspond to the front axle brake control module 24' according to FIG. 2.

The rear axle brake control module 52" is connected via electrical lines 102' to electro-mechanical actuator elements 98' for activating the wheel brakes at the wheels 56 of the rear axle. The rear axle brake control module 52" also has an independent electrical power supply in the form of the battery B2. Furthermore, the rear axle brake control module 52" is connected to the compressed air reservoir vessel 74 via a compressed air line 170. The rear axle brake control module 52" is, however, connected now to the spring-loaded brake cylinders 113 at the wheels 20 of the front axle via compressed air lines 172. These spring-loaded brake cylinders 113 make available a parking braking function, controlled by the rear axle brake control module 52", at the front axle. Moreover, the electrical terminals and the wiring of the rear axle brake control module 52" correspond to the rear axle brake control module 52' according to FIG. 2.

As a result of the criss-cross solution, achieved in this way, for the control of the parking brake of one axle by the respective brake control module of the other axle, a high degree of fault tolerance is provided. Even if a brake control module fails, all the wheels of both axles can still be braked, specifically by means of the service brake at one axle and by means of the parking brake at the other axle. Failure of a brake control module is detected by the respective other brake control module as a result of communication no longer taking place satisfactorily via the data line 59. This detecting brake control module then assumes the corresponding, requested braking function at the corresponding axle. This can significantly increase safety in road traffic.

Figure 6:
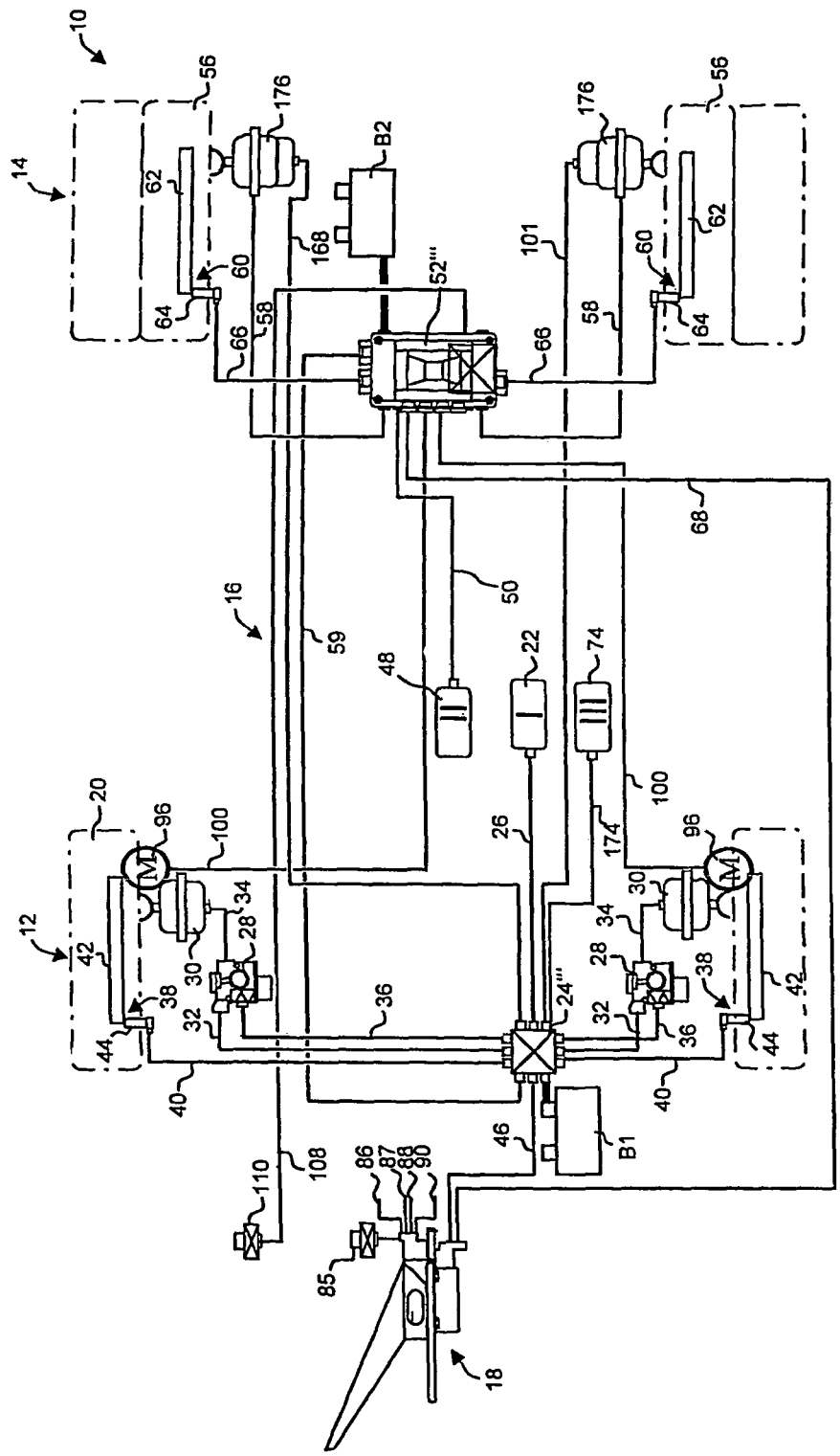
FIG. 6 is a schematic illustration of a brake system according to a sixth exemplary embodiment of the invention.

FIG. 6 shows a further exemplary embodiment in which the service brake is implemented electro-pneumatically and the parking brake electro-pneumatically at the rear axle and electro-mechanically at the front axle. The embodiment, the terminals and the wiring of the brake pedal device 18 correspond again to those from FIGS. 1, 2, 4 and 5, respectively. However, the front axle brake control module 24' controls the (electro-pneumatic) service brake at the front axle and the (electro-pneumatic) parking brake at the rear axle, while the rear axle brake control module 52' controls the (electro-pneumatic) service brake at the rear axle and the (electro-pneumatic) parking brake at the front axle. Both the front axle brake control module 24' and the rear axle brake control module 52' have electrical and pneumatic components and terminals/ports.

The front axle brake control module 24' is, as in FIGS. 1 and 4, connected via compressed air lines 32 and electrical lines 36 to valves 28 for making available an anti-lock braking function at the wheel brakes of the wheels 20 of the front axle. In this context, the valves 28 are connected to the brake cylinders 30 of these wheel brakes via compressed air lines 34. The front axle brake control module 24' also has an independent electrical power supply in the form of the battery B1. Furthermore, the front axle brake control module 24' is connected via the compressed air line 26 to the compressed air reservoir vessel 22 for making available compressed air for the brake cylinders 30, and, via a further compressed air line 174, to the compressed air reservoir vessel 74. In addition, the front axle brake control module 24' is connected via compressed air lines 168 to combined spring-loaded/diaphragm brake cylinders 176 at the wheels 56 of the rear axle. These spring-loaded/diaphragm brake cylinders 176 make available, by means of a spring-loaded part, a parking braking function controlled by the front axle brake control module 24' at the rear axle, and by means of a diaphragm part, a service braking function controlled by the rear axle control module 52' In order to release the parking brake, the respective spring-loaded parts are ventilated with compressed air from the compressed air reservoir vessel 74 under the control of the front axle brake control module 24'. In order to engage the parking brake, these spring-loaded parts are vented. Moreover, the electrical terminals and the wiring of the front axle brake control module 24' correspond to the front axle brake control module 24 according to FIG. 1.

The rear axle brake control module 52' is connected via compressed air lines 58 to the diaphragm parts of the combined spring-loaded/diaphragm brake cylinders 176 at the wheels 56 of the rear axle. The rear axle brake control module 5T has, in turn, an independent electrical power supply in the form of the battery B2. Furthermore, the rear axle brake control module 52' is connected to the compressed air reservoir vessel 48 via a compressed air line 50. The rear axle brake control module 52' is, as in the exemplary embodiment according to FIG. 4, connected via electrical lines 100 to the electro-mechanical actuator elements 96 at the wheel brakes of the wheels 20 of the front axle, with the result that these actuator elements 96 are controlled by the rear axle brake control module 52'. Moreover, the electrical terminals and the wiring of the rear axle brake control module 52' correspond to the rear axle brake control module 52 according to FIG. 4.

As a result of the criss-cross solution, achieved in this way, for the control of the parking brake of one axle by the respective brake control module of the other axle, a high degree of fail safety is in turn provided. Even it as explained in conjunction with the exemplary embodiment according to FIG. 5, a brake control module fails, all the wheels of both axles can still be braked, specifically by means of the service brake at one axle and by means of the parking brake at the other axle. Failure of a brake control module is detected by the respective other brake control module as a result of communication no longer occurring satisfactorily via the data line 59. This detecting brake control module then assumes the corresponding, requested braking function at the corresponding axle. Furthermore, this exemplary embodiment further increases safety as a result of the parking brake being embodied as a hybrid brake, i.e., as an electro-pneumatic and electro-mechanically operating parking brake. Because of this hybrid configuration of the parking brake, the parking brake can still be applied even if the pneumatic part or the electrical part of the parking brake has failed. This therefore can further increase safety in road traffic.

All the features mentioned in the description above and in the claims can also be combined individually with the brake system according to the invention. The invention is therefore not restricted to the feature combinations described or to those claimed. All the combinations of individual features are instead to be considered as being disclosed.

Thus, it will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A brake system for a vehicle, comprising a service brake device configured to provide a service braking function for braking the vehicle; and a parking brake device configured to provide a parking braking function for the vehicle independent of the service brake device, the service brake device comprising at least one service brake control module and at least one service brake circuit, the parking brake device comprising at least one autonomous parking brake control unit separate from the at least one service brake control module, the at least one autonomous parking brake control unit having a terminal configured to receive power from a first electrical power supply independent of a second electrical power supply for the at least one service brake circuit, the at least one autonomous parking brake control unit being configured to monitor the service brake device to detect when the service brake device fails one of partially and completely, the parking brake device being configured to automatically assume the service braking function and brake the vehicle in metered fashion based on changes in at least one electrical braking request signal of a brake pedal device when the service brake device fails one of partially and completely, and the service brake device being configured to automatically assume the parking braking function when the parking brake device fails one of partially and completely, wherein when the service brake device fails partially, the parking brake device assumes the service braking function for wheels affected by the partial failure of the service brake device.

2. The brake system as claimed in claim 1, wherein the brake pedal device is configured to generate the at least one electrical braking request signal.

3. The brake system as claimed in claim 1, wherein the service brake device is operable electro-pneumatically, and wherein the parking brake device is operable electro-mechanically at wheels of a first axle of the vehicle and electro-pneumatically at wheels of a second axle of the vehicle, and wherein brake cylinders of the service brake device at the wheels of the first axle are pneumatically connected to a first service brake control module of the at least one service brake control module, and wherein diaphragm parts of combined spring-loaded/diaphragm brake cylinders of the service brake device at the wheels of the second axle are pneumatically connected to a second service brake control module of the at least one service brake control module, and wherein spring-loaded parts of the combined spring-loaded/diaphragm brake cylinders are pneumatically connected to the first service brake control module, and wherein electro-mechanical actuator elements at the wheels of the first axle are connected to the second service brake control module.

4. The brake system as claimed in claim 1, wherein the parking brake device is further configured to automatically brake the vehicle when the service brake device fails one of partially and completely.

5. The brake system of claim 1, wherein the at least one autonomous parking brake control unit is configured to monitor the service brake device by receiving data regarding the at least one service brake circuit from the brake pedal device.

6. The brake system as claimed in claim 1, further comprising an electro-mechanical brake pedal device configured to generate the at least one electrical brake request signal and to activate the at least one service brake circuit.

7. The brake pedal system as claimed in claim 6, the brake pedal device further comprising a control device configured to evaluate received input signals and to output signals generated from the input signals.

8. The brake system as claimed in claim 1, wherein the service brake device is operable electro-mechanically and includes (i) electro-mechanical actuator elements at wheels of a first axle of the vehicle and at wheels of a second axle of the vehicle, the electro-mechanical actuator elements being configured to generate, in response to an electrical control signal, an electro-motive force to effect a mechanical movement for braking the wheels, and (ii) spring-loaded brake cylinders at at least one of the wheels of the first axle and the wheels of the second axle.

9. The brake system as claimed in claim 8, wherein ones of the electro-mechanical actuator elements at the wheels of the first axle are connected to and controllable by a first service brake control module of the at least one service brake control module, and wherein ones of the electro-mechanical actuator elements at the wheels of the second axle are connected to and controllable by a second service brake control module of the at least one service brake control module, and wherein the spring-loaded brake cylinders are pneumatically connected to the at least one parking brake control unit to one of engage and release the spring-loaded brake cylinders.

10. The brake system as claimed in claim 8, wherein ones of the electro-mechanical actuator elements at the wheels of the first axle are connected to and controllable by a first service brake control module of the at least one service brake control module, and wherein ones of the electro-mechanical actuator elements at the wheels of the second axle are connected to and controllable by a second service brake control module of the at least one service brake control module, and wherein ones of the spring-loaded brake cylinders at the wheels of the first axle are pneumatically connected to the second service brake control module, and wherein ones of the spring-loaded brake cylinders at the wheels of the second axle are pneumatically connected to the first service brake control module to one of engage and release the spring-loaded brake cylinders.

11. The brake system as claimed in claim 1, wherein the at least one service brake circuit comprises at least one pressure-medium-operated service brake circuit, and wherein the parking brake device is operable to brake the vehicle, in response to an electrical control signal, one of (i) electro-mechanically via at least one electro-mechanical actuator element and (ii) electro-pneumatically via at least one spring-loaded brake cylinder controllable by an electro-pneumatic valve device.

12. The brake system as claimed in claim 11, wherein the one of the at least one electro-mechanical actuator element and the at least one spring-loaded brake cylinder is adjustable in metered fashion by changing the electrical control signal.

13. The brake system as claimed in claim 11, wherein the parking brake device is configured to brake the vehicle in metered fashion to provide an auxiliary braking function when the service brake device fails one of partially and completely.

14. The brake system as claimed in claim 11, wherein the parking brake device includes one of (i) at least one of the at least one electro-mechanical actuator element and (ii) the at least one spring-loaded brake cylinder on wheels of the vehicle brakable by a brake cylinder of the service brake device.

15. The brake system as claimed in claim 11, wherein the at least one electro-mechanical actuator element of wheels of at least one rear axle of the vehicle are connected to and controllable by a first service brake control module of the at least one service brake control module associated with a first service brake circuit of the at least one service brake circuit of the service brake device, and the at least one electro-mechanical actuator element of wheels of at least one front axle of the vehicle are connected to and controllable by a second service brake control module of the at least one service brake control module associated with a second service brake circuit of the at least one service brake circuit of the service brake device.

16. The brake system as claimed in claim 15, wherein the first service brake circuit is configured to brake the wheels of the at least one front axle, and the first service brake control module is configured to control the service brakes of the at least one front axle, and wherein the second service brake circuit is configured to brake the wheels of the at least one rear axle, and the second service brake control module is configured to control the service brakes of the at least one rear axle.

17. The brake system as claimed in claim 11, wherein one of the at least one electro-mechanical actuator element and the at least one spring-loaded brake cylinder is connected to and controllable by the at least one parking brake control unit.

18. The brake system as claimed in claim 17, wherein the first electrical power supply is configured to supply electricity to one of the at least one electro-mechanical actuator element and the electro-pneumatic valve device.

19. The brake system as claimed in claim 17, wherein the at least one parking brake control unit is configured to detect a failed circuit of the at least one service brake circuit.

20. The brake system as claimed in claim 19, wherein the at least one parking brake control unit is configured to effect braking of the wheels of the failed circuit as a function of the at least one electrical braking request signal using one of the at least one electro-mechanical actuator element and the at least one spring-loaded brake cylinder.

21. The brake system as claimed in claim 19, wherein the at least one parking brake control module and the at least one service brake control unit are connected via a data line.

22. The brake system as claimed in claim 21, wherein the data line is a CAN bus.

23. The brake system as claimed in claim 19, wherein the at least one service brake control module is configured to monitor and to detect a failure of one of (i) the parking brake control unit, (ii) the at least one electro-mechanical actuator element, (iii) the electro-pneumatic valve device, and (iv) the at least one spring-loaded brake cylinder, and wherein the at least one service brake control module is configured to effect braking of wheels of the vehicle affected by the failure as a function of a parking brake signal using the service brake device.

24. The brake system as claimed in claim 23, further comprising at least one of a parking brake signal generator and a rolling brake signal generator.

25. The brake system as claimed in claim 23, wherein the at least one service brake control module is controllable to maintain functionality of the service brake device for a predetermined time period when an ignition system of the vehicle is shut down.

26. The brake system as claimed in claim 25, wherein the second electrical power supply is configured to supply power to the at least one service brake control module, and wherein the second electrical power supply is electrically connected to the at least one service brake control module during the predetermined time period.

27. The brake system as claimed in claim 25, wherein the brake pedal device is configured to effect the output of at least one of a visual and acoustic warning signal before the expiry of the predetermined time period.

28. A braking method for a vehicle, the vehicle including a service brake device configured to provide a service braking function and a parking brake device configured to provide a parking braking function independently of the service brake device, the service brake comprising at least one service brake control module and at least one service brake circuit, the parking brake device comprising at least one autonomous parking brake control unit separate from the at least one service brake control module, the at least one autonomous parking brake control unit having a terminal configured to receive power from a first electrical power supply independent of a second electrical power supply for the at least one service brake circuit, the method comprising the steps of: using the at least one autonomous parking brake control unit to monitor the service brake device to detect when the service brake device fails one of partially and completely; and when the service brake device fails one of partially and completely, automatically assuming the service braking function and braking the vehicle by means of the parking brake device in metered fashion based on changes in an electrical braking request signal of a brake pedal device, wherein when the service brake device fails partially, the parking brake device assumes the service braking function for wheels affected by the partial failure of the service brake device.

29. The braking method of claim 28, wherein using the at least one autonomous parking brake control unit to monitor the service brake device comprises using the at least one autonomous parking brake control unit to monitor the service brake device based on data regarding the at least one service brake circuit, the data being received by the at least one autonomous parking brake control unit from a brake pedal device.

* * * * *